US012807448B2

(12) United States Patent
Vannucchi et al.

(10) Patent No.: US 12,807,448 B2
(45) Date of Patent: Nov. 24, 2026

(54) SHINGLING DEVICE AND SHEET PRODUCTION LINE COMPRISING THE SHINGLING DEVICE

(71) Applicant: FOSBER S.P.A., Pescaglia (IT)

(72) Inventors: Lorenzo Vannucchi, Pescaglia (IT); Marco Imposti, Pescaglia (IT); Sauro Ruberti, Pescaglia (IT)

(73) Assignee: FOSBER S.P.A., Pescaglia (IT)

( * ) Notice: Subject to any disclaimer, the term of this patent is extended or adjusted under 35 U.S.C. 154(b) by 0 days.

(21) Appl. No.: 19/297,234

(22) Filed: Aug. 12, 2025

(65) Prior Publication Data

US 2026/0054952 A1 Feb. 26, 2026

(30) Foreign Application Priority Data

Aug. 20, 2024 (IT) ........................ 102024000019084

(51) Int. Cl.

*B65H 29/66* (2006.01)
*B31F 1/28* (2006.01)
*B65G 37/00* (2006.01)

(52) U.S. Cl.

CPC ....... *B65H 29/6618* (2013.01); *B31F 1/2822* (2013.01); *B65G 37/00* (2013.01); *B65H 2301/421* (2013.01); *B65H 2301/444* (2013.01); *B65H 2301/5151* (2013.01); *B65H 2403/725* (2013.01)

(58) Field of Classification Search

CPC .......... B65H 29/6618; B65H 2301/421; B65H 2301/444; B65H 2301/5151; B31F 1/2822; B65G 37/00

See application file for complete search history.

(56) References Cited

U.S. PATENT DOCUMENTS

| | | | | |
|---|---|---|---|---|
| 3,942,786 A * | 3/1976 | Lauren | B65H 29/6627 | 83/88 |
| 4,214,744 A * | 7/1980 | Evans | B65H 29/16 | 198/836.2 |
| 4,240,856 A * | 12/1980 | Craemer | B65H 29/6627 | 271/69 |
| 4,436,302 A * | 3/1984 | Frye | B65H 29/6627 | 271/216 |

(Continued)

FOREIGN PATENT DOCUMENTS

| | | | |
|---|---|---|---|
| DE | 102010008906 A1 | 11/2010 | |
| DE | 102013221222 A1 * | 4/2015 | B65H 29/6618 |

(Continued)

*Primary Examiner* — Lucas E. A. Palmer

(74) *Attorney, Agent, or Firm* — Breiner & Breiner, L.L.C.

(57) ABSTRACT

The shingling device comprises: a shingling conveyor, adapted to receive a stream of sheets aligned with one another and not overlapping; a braking device, positioned above the shingling conveyor and configured to slow down the sheets arriving to the shingling conveyor, and to partially overlap the incoming sheets in shingling fashion. The braking device comprises: a first set of braking wheels aligned with one another along a first rotation axis orthogonal to a feed direction of the sheets to the shingling conveyor; and a second set of braking wheels aligned with one another along a second rotation axis orthogonal to the feed direction of the sheets to the shingling conveyor.

13 Claims, 9 Drawing Sheets

(56) References Cited

U.S. PATENT DOCUMENTS

| | | | | | |
|---|---|---|---|---|---|
| 4,447,052 | A * | 5/1984 | Muller | B65H 29/60 | 271/227 |
| 4,548,404 | A * | 10/1985 | Brandt | B65H 29/62 | 198/462.2 |
| 4,667,953 | A * | 5/1987 | Hirakawa | B65H 33/12 | 83/88 |
| 4,973,039 | A * | 11/1990 | Jeske | B65H 29/6618 | 271/262 |
| 5,054,763 | A * | 10/1991 | Achelpohl | B65H 33/12 | 198/419.3 |
| 5,160,132 | A * | 11/1992 | Hanada | B65H 29/16 | 271/265.01 |
| 5,265,862 | A * | 11/1993 | Jones | B65H 29/68 | 271/182 |
| 5,275,394 | A * | 1/1994 | Mank | B65H 29/6636 | 271/216 |
| 5,496,024 | A * | 3/1996 | Luethi | B65H 5/023 | 271/275 |
| 5,626,336 | A * | 5/1997 | Adami | B65H 29/66 | 271/182 |
| 5,829,951 | A * | 11/1998 | Adami | B65H 33/12 | 414/790.7 |
| 5,957,050 | A * | 9/1999 | Scheffer | B65H 35/08 | 414/788.1 |
| 6,398,010 | B1 * | 6/2002 | Fangmeier | B65H 29/6618 | 198/462.1 |
| 6,561,507 | B1 * | 5/2003 | Pollock | B65H 29/68 | 271/182 |
| 7,628,396 | B2 * | 12/2009 | Moore | B65H 29/242 | 271/197 |
| 9,486,992 | B2 * | 11/2016 | St. Ours | B65H 29/6618 | |
| 2015/0033922 | A1 * | 2/2015 | Grill | B65H 3/34 | 83/78 |
| 2020/0165094 | A1 * | 5/2020 | Schilling | B65H 29/68 | |
| 2025/0296312 | A1 * | 9/2025 | Vannucchi | B31F 1/2836 | |

FOREIGN PATENT DOCUMENTS

| | | | | |
|---|---|---|---|---|
| EP | 602023 | A1 * | 6/1994 | |
| EP | 1362691 | A2 | 11/2003 | |
| EP | 3678859 | B1 | 8/2021 | |
| FR | 2233266 | A2 * | 1/1975 | |
| JP | H08113405 | A | 5/1996 | |
| WO | WO-2007101611 | A1 * | 9/2007 | B65H 33/12 |
| WO | WO-2011134583 | A1 * | 11/2011 | B65H 29/6618 |
| WO | 2017036685 | A1 | 3/2017 | |
| WO | 2021005123 | A1 | 1/2021 | |

* cited by examiner

SHINGLING DEVICE AND SHEET PRODUCTION LINE COMPRISING THE SHINGLING DEVICE

TECHNICAL FIELD

The present disclosure relates to the field of sheet production, particularly but not exclusively, corrugated board sheets.

BACKGROUND ART

Sheets of corrugated board are usually produced from continuous strips of paper. At least one continuous strip of paper is corrugated in a corrugator and combined with two smooth strips. The resulting corrugated board is cut into sheets, and the sheets are stacked for later distribution.

The production lines are usually divided into an upstream portion, so-called "wet end," where there are the machines working in humid and warm conditions to process paper webs and produce the continuous corrugated board; and a downstream portion, so-called "dry end," where the continuous corrugated board is divided into longitudinal strips that are in turn divided into individual sheets. The sheets are fed to a stacker, which is part of the "dry end", and stacked in bundles or stacks. To perform this operation, the sheets, coming from a cut-off knife and fed at high speed, are slowed down and arranged partially overlapping each other, that is, in a so-called "shingling" fashion. To this end, conveyors and braking members are provided. Typically, the braking members comprise brushes that slow down the sheets by friction, rubbing the upper surface thereof, with the risk of damaging them.

Other braking systems use wheels or rollers, see for example U.S. Pat. No. 4,240,856. These systems have some drawbacks, because of which they have practically fallen into disuse. In particular, compared with the braking brushes, the braking wheel or roller systems are very cumbersome and slow to position when the production line transitions from one order to another, especially when the sheet length in the feed direction differs between successive orders.

Therefore, it would be useful to provide a line for the production and stacking of sheets, especially but not exclusively of corrugated board, with a shingling system that allows to overcome the limitations and drawbacks of the prior art systems.

SUMMARY

According to a first aspect, a shingling device is disclosed herein for partially overlapping the sheets of a stream of sheets in shingling fashion.

The shingling condition is a condition where the sheets are partially overlapped with one another.

The shingling device comprises a shingling conveyor, adapted to receive a stream of sheets aligned with one another and not overlapping. The shingling device also comprises a braking device, positioned above the shingling conveyor and configured to slow down the sheets arriving to the shingling conveyor, and to partially overlap the incoming sheets in shingling fashion. The braking device comprises: a first set of braking wheels aligned with one another along a first rotation axis orthogonal to a feed direction of the sheets on the shingling conveyor; and a second set of braking wheels aligned with one another along a second rotation axis orthogonal to the feed direction of the sheets on the shingling conveyor. The first set of braking wheels and the second set of braking wheels are movable independently of each other along the shingling conveyor so as to take working positions at variable distances from an entrance end of the shingling conveyor.

The shingling device can be used in various processing lines where it is necessary to generate a flow of shingled sheets.

In particular, an application of the device to a line for producing sheets, for example corrugated board sheets, is described herein.

Further characteristics and applications of the device are described below and defined in the attached claims.

BRIEF DESCRIPTION OF THE DRAWING

The invention will be better understood by following the description below and the accompanying drawing, showing a non-limiting embodiment of the invention. More specifically, in the drawing.

DETAILED DESCRIPTION

Figures 1A, 1B:
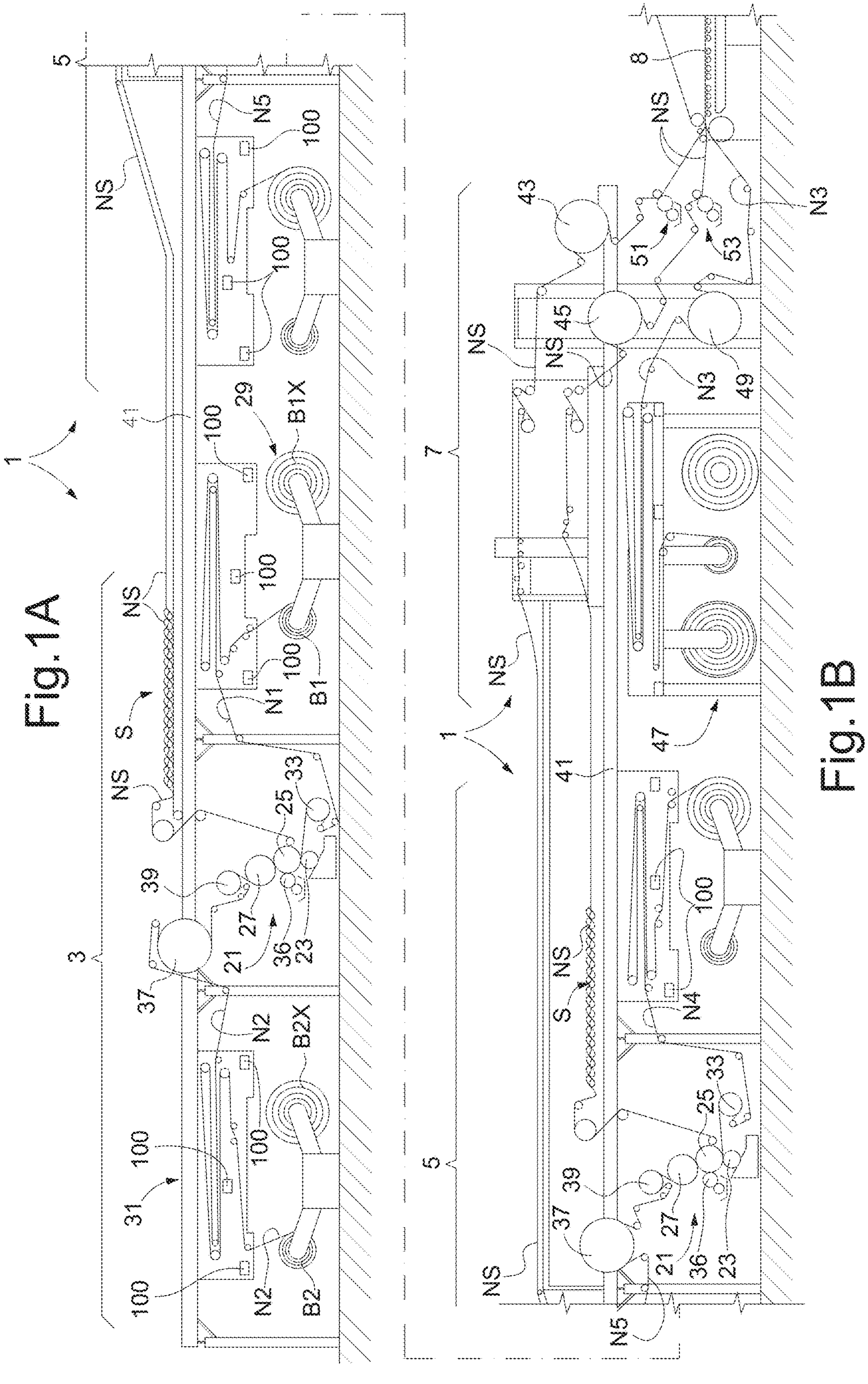
FIGS. 1A-1D show a production line for producing corrugated board sheets.
Figure 1C:
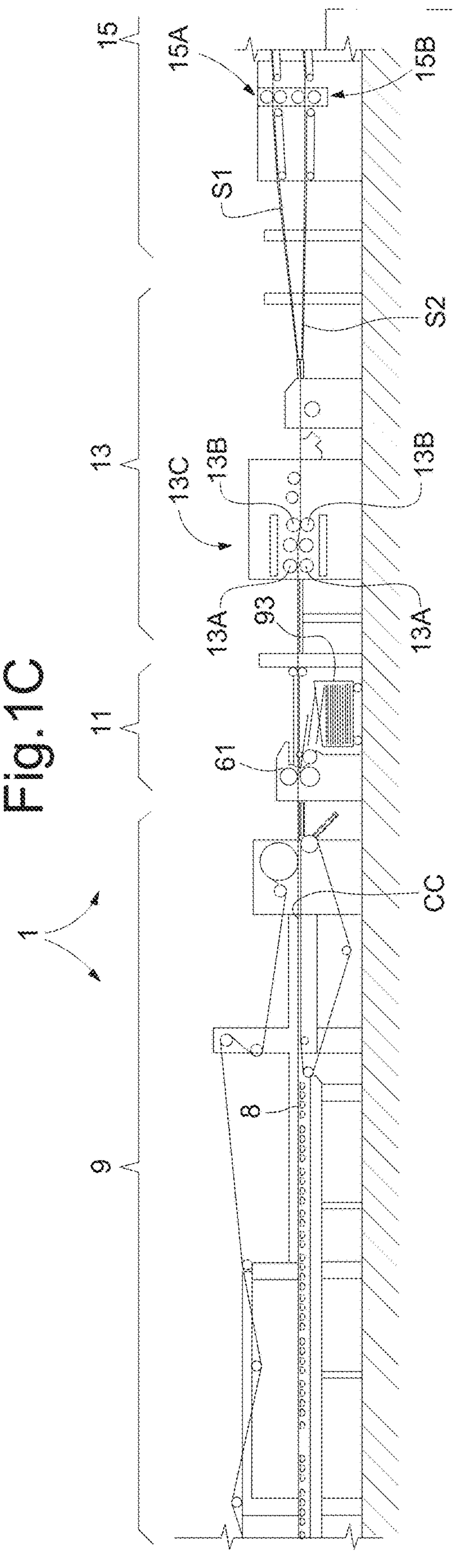

In the following description, specific reference will be made to the use of the shingling device in a corrugated board sheet production line. The line is described as a whole, starting from the devices for unwinding the paper webs used for the production of corrugated board, to the stacker.

However, it should be understood that a shingling device as described herein can also be used in other types of production lines, even lines for the production of sheets of material other than corrugated board, whenever there are problems similar to those solved by the shingling device disclosed in the present invention.

With reference to the accompanying figures, in the accompanying drawing, the reference numeral 1 indicates as a whole a plant or line for the production of adequately scored sheets of corrugated board from continuous webs of smooth paper.

In the illustrated embodiment, the plant provides for the production of sheets of double wall corrugated board, i.e. with two webs of fluted paper interposed between two webs of smooth paper, so-called liners, and a web of smooth paper interposed between the two fluted paper webs. Moreover, the plant is configured to form two stacks of sheets on two adjacent stackers.

The general structure of the plant is similar to that disclosed in WO 2017/0366685 or WO 2021005123A1. However, the various sections and machines constituting the plant can be even arranged in a substantially different manner than that illustrated in the disclosed embodiment. For example, the plant can have the structure disclosed in EP 3678859 or in DE 10201000890.

With reference to the illustrated embodiment, the plant 1 comprises a first section 3 for the production of a first web NS of single-face corrugated board, a second section 5 for the production of a second web NS of single-face corrugated board, a third section 7 for feeding the two webs of single-face corrugated board and a web of smooth paper to a double facer 8, a section 9 comprising the double facer 8 and the corresponding ancillary devices. From section 9 a double wall corrugated board CC exits, formed by the set of the webs NS of single-face corrugated board and the web of smooth paper glued thereto, the smooth paper web forming a second liner of the corrugated board web.

A converting system is provided downstream of section 9 to convert the corrugated board web CC into single sheets of one or more distinct production orders or batches. In general, the converting system comprises longitudinal and transverse cutting systems as well as longitudinal scoring systems for cutting the corrugated board web CC into strips, scoring the strips and cutting the various strips into separate sheets.

Downstream of the double facer 8, a section 11 is provided, where devices are arranged for removing trimmings and changing orders, and, downstream of section 11, a section 13 is provided for longitudinally cutting and scoring the corrugated board CC coming from the section 9 containing the double facer 8, in order to divide the corrugated board web into a plurality of longitudinal strips of corrugated board.

Moreover, the plant 1 comprises a section 15 for transversely cutting the corrugated board strips coming from the section 13, a double conveyor system 17 and, lastly, two stacking platforms, or stackers, 19A and 19B for stacking the cardboard sheets cut in the section 15 and fed by means of the double conveyor system 17.

In section 3, a first corrugator 21 is arranged. Corrugators usable for producing a web of single-face corrugated board are known in se. Only the main elements of the corrugator will be described hereunder, the corrugator being for example as that disclosed in U.S. Pat. No. 7,871,423 or in EP 1362691, whose content is incorporated herein by reference.

Briefly, the corrugator 21 comprises a first corrugating roller 23 co-acting with a second corrugating roller 25 and a pressure roller 27, or other pressure member, to bond a web of smooth paper and a web of fluted paper together. More in particular, a first web N1 of smooth paper is fed to the corrugator 21 from a first unwinder 29. The unwinder 29 may be constructed in a manner known in the art, thus it will not be described in detail. The unwinder 29 may comprise two or more positions for a first unwinding reel B1, from which the first smooth paper web N1 is supplied, and a second, standby reel B1X, which will be unwound when the reel B1 is depleted.

A second web N2 of smooth paper is unwound from a second unwinder 31, which can be substantially equal to the unwinder 29, and onto which a first reel B2, from which the smooth paper web N2 is unwound, and a second, standby reel B2X are arranged, the standby reel B2X starting to be unwound when the reel B2 is depleted.

The first smooth paper web N1 is directed to the corrugating roller 23, after being routed around a heating roller 33. The wrapping angle of the smooth paper web N1 around the heating roller 33 can be modified in order to transfer to the smooth paper web N1 a greater or lower amount of heat coming from inside the heating roller 33 or a heating plate, heated for example by steam circulating therein.

The first smooth paper web N1 is fluted passing through the nip formed between the corrugating rollers 23 and 25. By means of an application roller 36 of a gluing unit, a suitable glue is applied to the crests formed on the fluted paper web, so that the fluted paper web N1 can be glued onto the smooth paper web N2 fed, together with the fluted paper web N1, through the nip formed between the second corrugating roller 25 and the pressure roller 27.

The application roller is in contact with the crests of the fluted paper web N1 routed around the second corrugating roller 25. The application roller 36 receives the glue from a tank or the like.

In some embodiments, the second smooth paper web N2 is routed around one or more heating rollers or plates 37, 39 arranged between the unwinder 31 and the corrugator 21, in order to be heated. The wrapping angle between the smooth paper web N2 and any one or both of the rollers 37, 39 can be modified in order to vary the amount of heat transferred by the roller(s) 37, 39 to the smooth paper web N2 before it comes into contact with the pressure roller 27. Also the pressure roller can be heated internally to glue the paper webs N1 and N2 in conditions of high pressure and high temperature.

Instead of, or in combination with, heating rollers, heating plates can be provided, having the same purpose.

Figure 2A:
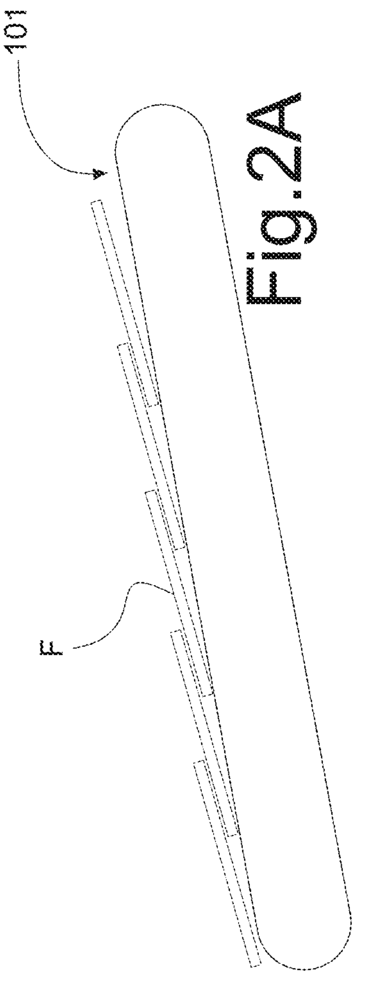
FIG. 2A is a schematic enlargement of corrugated board sheets overlapping each other in shingled fashion on the shingling conveyor.
Figure 2:
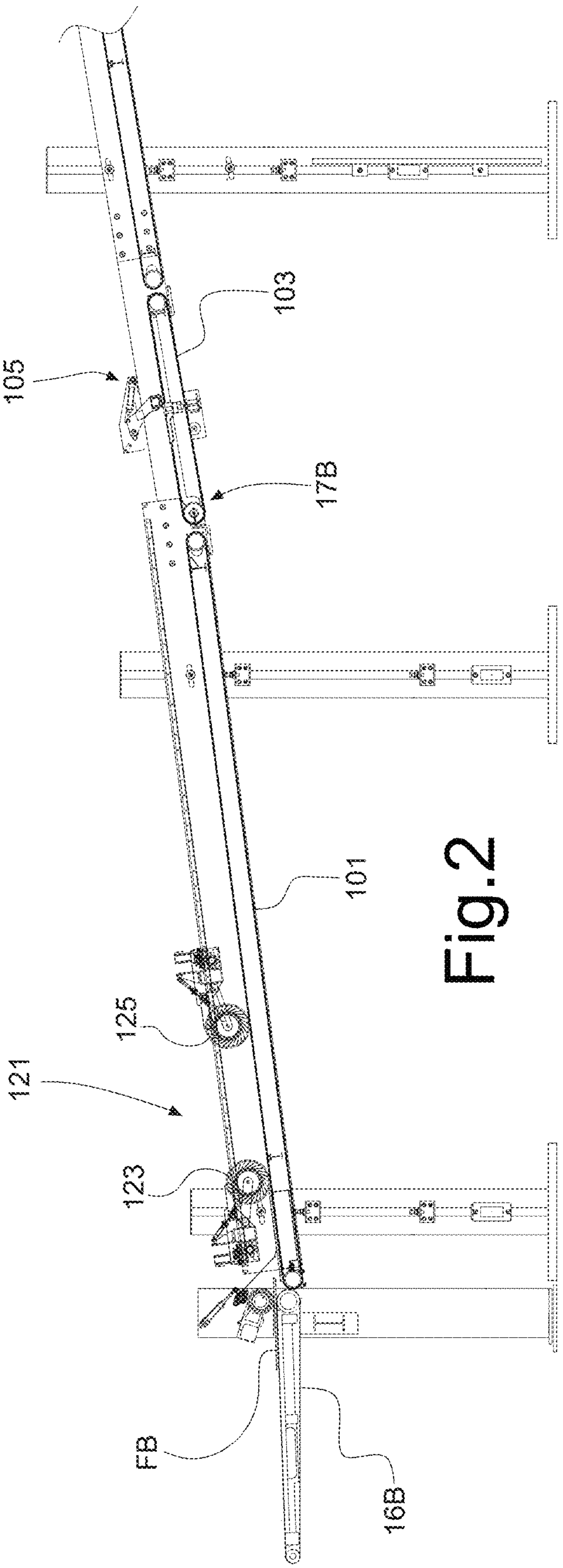
FIG. 2 is enlargement of a portion of the end of the line in FIGS. 1A-1D.

At the output of the corrugator 21, a single-face corrugated board web NS is obtained, formed by the first fluted paper web N1 and the second smooth paper web N2, as shown in the enlargement of FIG. 2. The waves or flutes formed on the first fluted paper web N1 are glued by means of a glue C, applied by the gluing unit to the flutes O of the fluted paper web N1, onto the surface of the smooth paper web N2 facing the fluted paper web N1.

Both the first unwinder 29 and the second unwinder 31 comprise a splicer, schematically indicated by the reference numeral 100 for both the unwinders. The splicer 100 is typically comprised of more components, schematically shown in the figure, that can take variable mutual positions based on which reel is being processed and which is waiting.

Downstream of the corrugator 21 a bridge 41 is provided, which extends towards the section 5 and the following sections 7 and 9 of the plant 1. A stock S of single-face corrugated board web NS may be formed on the bridge 41. The web of single-face corrugated board NS is then fed along a first path, which extends above the bridge 41 up to a heating roller 43 or other heating system, around which the single-face corrugated board NS can be routed for an adjustable wrapping angle, to be appropriately heated before reaching the double facer 8 of the section 9.

In the illustrated embodiment, the plant 1 comprises a second section 5 substantially equal to the section 3, where a second single-face corrugated board web, still indicated with NS, is formed, by means of a further pair of paper webs N4, N5 coming from unwinders analogous to the unwinders 29 and 31, and a corrugator analogous to the corrugator 21. The second single-face corrugated board web NS is fed to the bridge 41 to form a stock S and to be fed towards the double facer 8 of the section 9, being wrapped around a heating roller 45 or other heating member, substantially equivalent to the heating roller 43. In other embodiments, the section 5 can be omitted, as well as the respective corrugator. In further embodiments, more than two sections 3, 5 may be provided, with respective corrugator and unwinder for corrugating and unwinding the paper web to form respective single-face corrugated board webs NS, which are then glued together by means of the double facer 8 of section 9.

A smooth paper web N3 is unwound from a further unwinder 47, provided with a splicer indicated again with the reference numeral 100, and is fed, preferably routed around a heating roller 49 or other heating member, to the section 9 of the double facer 8. Gluing units 51, 53 apply, in a known manner, a glue to the crests of the respective single-face corrugated board web NS, to glue them together and to the smooth paper web N3, which will form the second outer liner of the corrugated board CC coming out from section 9, the first outer liner being formed by the smooth paper web N2.

The section 9 containing the double facer 8 may be implemented in a known manner and will not be described in detail herein.

In section 11 a rotary shear or other cut-off member 61 is provided, which can perform transverse cuts to sever completely or only partially the corrugated board CC fed from section 9. The rotary shear 61 can be especially used to remove portions of corrugated board CC where gluing defects or other defects are detected, as well as to co-act in the format change sequence. In particular, the rotary shear is adapted to make intermediate transverse cuts in the corrugated board, so as to connect with one another longitudinal strips of consecutive orders in the transition area.

In the illustrated embodiment, the corrugated board CC, fed through the cutting and scoring section 13, is divided into strips which can be deviated along two paths defined by the two conveyor systems 17A, 17B of section 17, at different heights. In general, the cutting and scoring section 13 can comprise one or more slitter-scorers 13C that, in addition to longitudinally cut the corrugated board web CC into longitudinal strips, can generate side trimmings and form scoring lines. To this end, the slitter-scorer 13C may comprise one or more series of longitudinal scoring tools 13A and one or more series of longitudinal cutting tools 13B. Analogously, each series of longitudinal cutting tools can comprise a plurality of longitudinal cutting tools adapted to be arranged in adequate positions along a direction transverse to the feed direction of the corrugated board CC through the plant 1.

The two conveyor systems 17A, 17B convey corrugated board sheets obtained by cross-cutting continuous strips in section 15 to form stacks PA, PB on stacking planes 63, 65. In the illustrated embodiment, section 15 comprises two cut-off knifes 15A and 15B, configured to divide longitudinal strips S1, S2 into single sheets FA, FB. A variable number of strips can be fed to each cut-off knife 15A, 15B, based on the overall number of strips into which the corrugated board web CC has been divided by the slitter scorer 13C and the ways they have been distributed toward the two conveyors 17A, 17B.

In the illustrated embodiment, the section 17 is configured to work on two levels, with two separate conveyor systems 17A, 17B. In other embodiments, the line 1 may be simpler and comprise a single stacking level, for example only the conveyor system 17B with a single collection surface 63. In this case, the line 1 also has a single cut-off knife 15B.

Between each cut-off knife 15A, 15B, a feed conveyor 16A, 16B is provided, which feeds individual sheets, cut by the respective cut-off knife 15A, 15B, to the conveyor systems 17A, 17B.

The features of each of the conveyor systems 17A, 17B will be described in more detail below. Since the two conveyors are substantially similar, only the conveyor system 17B will be described below, being understood that the conveyor system 17A may have a similar configuration, as shown in particular in FIG. 1D.

Figure 1D:
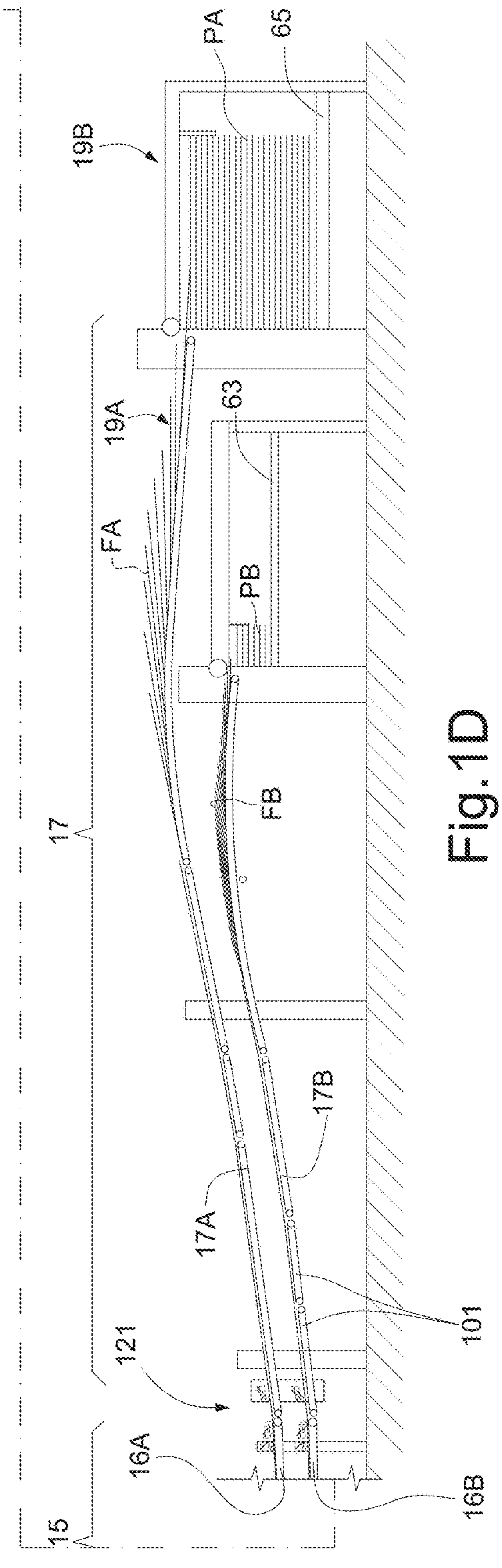

The conveyor system 17B comprises a series of conveyor elements arranged in sequence, shown in particular in the enlarged view of FIG. 2. More specifically, a shingling conveyor 101 is arranged downstream of the feed conveyor 16B, and a transfer conveyor 103 is arranged downstream of the shingling conveyor 101. Downstream of the transfer conveyor 103 (as shown in FIG. 1D) other conveyors can be provided, that are part of the conveyor system 17B.

A retaining member for temporary retaining the shingled sheets FB is associated with the transfer conveyor 103, wherein the retaining member can be configured in any way and has the function of creating a gap in the continuous flow of sheets FB coming from the cut-off knife 15B. The gap is created in order to allow the removal of a stack of sheets formed on the collection surface 63 and the formation of a new stack. An example of a temporary retaining device is disclosed for example in U.S. Pat. No. 5,415,389.

When the line 1 is in use, the shingling conveyor 101 moves forward at a speed slower than the speed of the feed conveyor 16B, to cause the sheets FB to partially overlap each another, as schematically shown in FIG. 2A, where some overlapping sheets FB are shown. The difference in feed speed between the feed conveyor 16B and the shingling conveyor 101 defines the degree of overlapping of the sheets FB. In the following figures, the overlapping sheets are not shown for the sake of simplicity of representation.

To efficiently slow down the sheets on the shingling conveyor 101, a suction system is provided, for example comprising a suction box 109 that extends along the first section of the upper branch of the shingling conveyor 101, so that the sheets arriving there are sucked against the shingling conveyor. The reference numeral 107 indicates a foil or brush provided for the same purpose at the entrance of the shingling conveyor 101. Upstream of the shingling conveyor 101, a pair of rollers 111 is provided, which define a sheet feeding nip and rotate in opposite directions at an appropriate peripheral speed, typically equal to the feed speed of the feed conveyor 16B.

An important aspect during the shingling process is that the sheets F shall not be damaged when interacting with braking members, while at the same time they shall be properly braked so as to be arranged in the correct position along the shingling conveyor 101 to allow successive sheets to overlap each other smoothly.

To this end, in the embodiment described herein, over the shingling conveyor 101 a braking device 121 is arranged, comprising a first set of braking wheels 123, aligned with one other along a first rotation axis 123A, orthogonal to the feed direction fF of the sheets FB on the shingling conveyor 101. The braking device 121 also comprises a second set of braking wheels 125 aligned with one another along a second rotation axis 125A parallel to the first rotation axis 123A and orthogonal to the feed direction of the sheets to the shingling conveyor. The first set of braking wheels 123 and the second set of braking wheels 125 are movable independently of each other according to the double arrows f123 and f125 along the shingling conveyor 101 so as to take working positions at variable distances from an entrance end of the shingling conveyor 101.

To this end, the braking wheels 123 of the first set of braking wheels are carried by a first slide 127 operatively coupled to guides 129 extending parallel to the shingling conveyor 101. Similarly, the braking wheels 125 of the second set of braking wheels are carried by a second slide 131, operatively coupled to the guides 129.

For moving the two slides 127 and 131 along the guides 129, independent actuators are provided for the two guides 127, 129. In the illustrated embodiment, the slide 127 is provided with an actuator 133, for example in the form of an electric motor, that drives into rotation a torsion bar extending parallel to the axis 123A and has, at its ends, respective pinions 134 meshing with racks integral with, or forming part of, the guides 129. Similarly, the slide 131 is provided with an actuator 135, for example in the form of an electric motor, that drives into rotation a torsion bar extending parallel to the axis 125A and has, at its ends, respective pinions 136 meshing with the racks integral with, or forming part of, the guides 129.

The two actuators 133 and 135 allow the two slides 127 and 131 to be translated independently of each other along the shingling conveyor 101, for the purposes that will be explained below.

Figure 3:
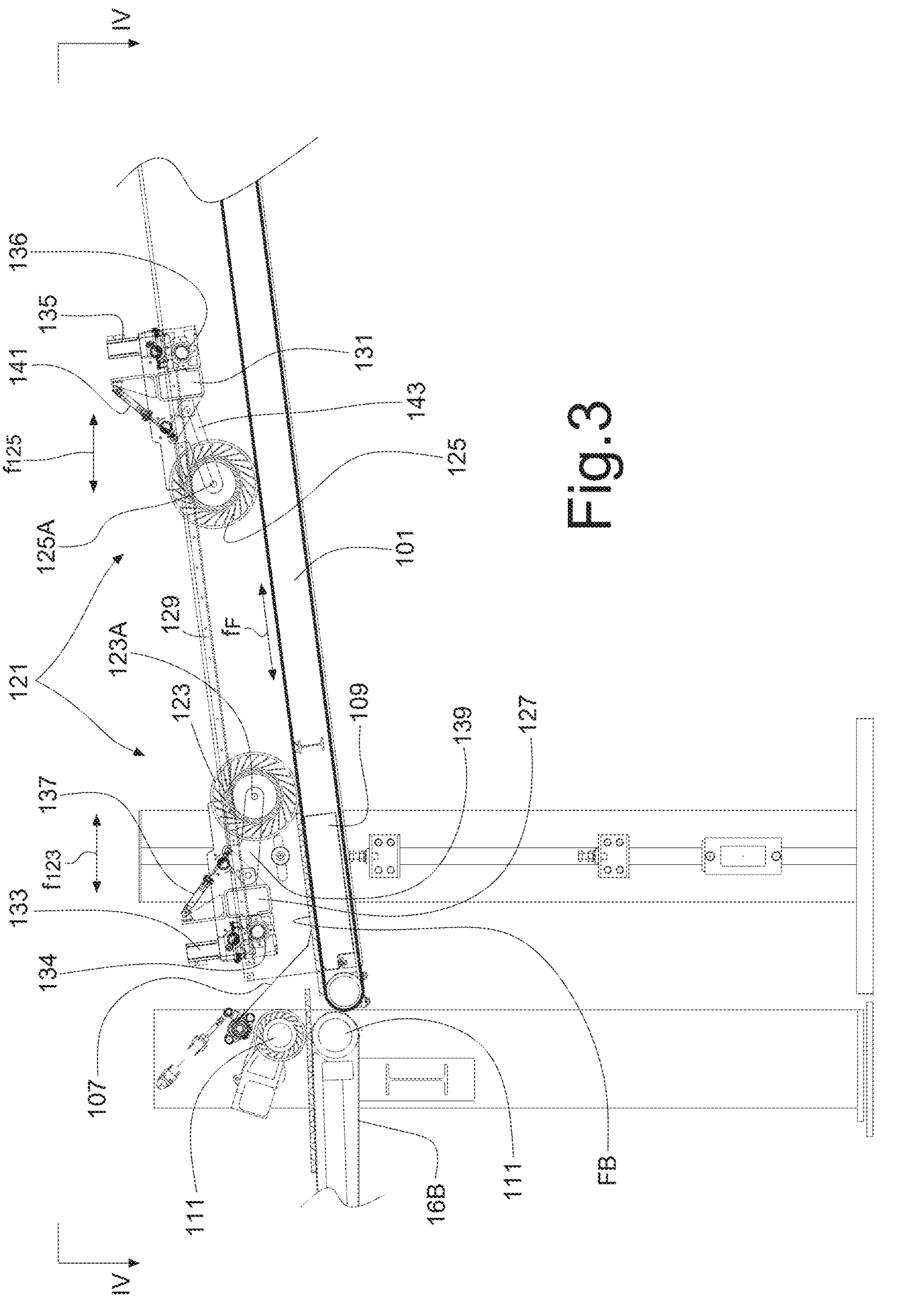
FIG. 3 shows an enlargement of a side view of the shingling conveyor with the respective braking device.
Figure 4:
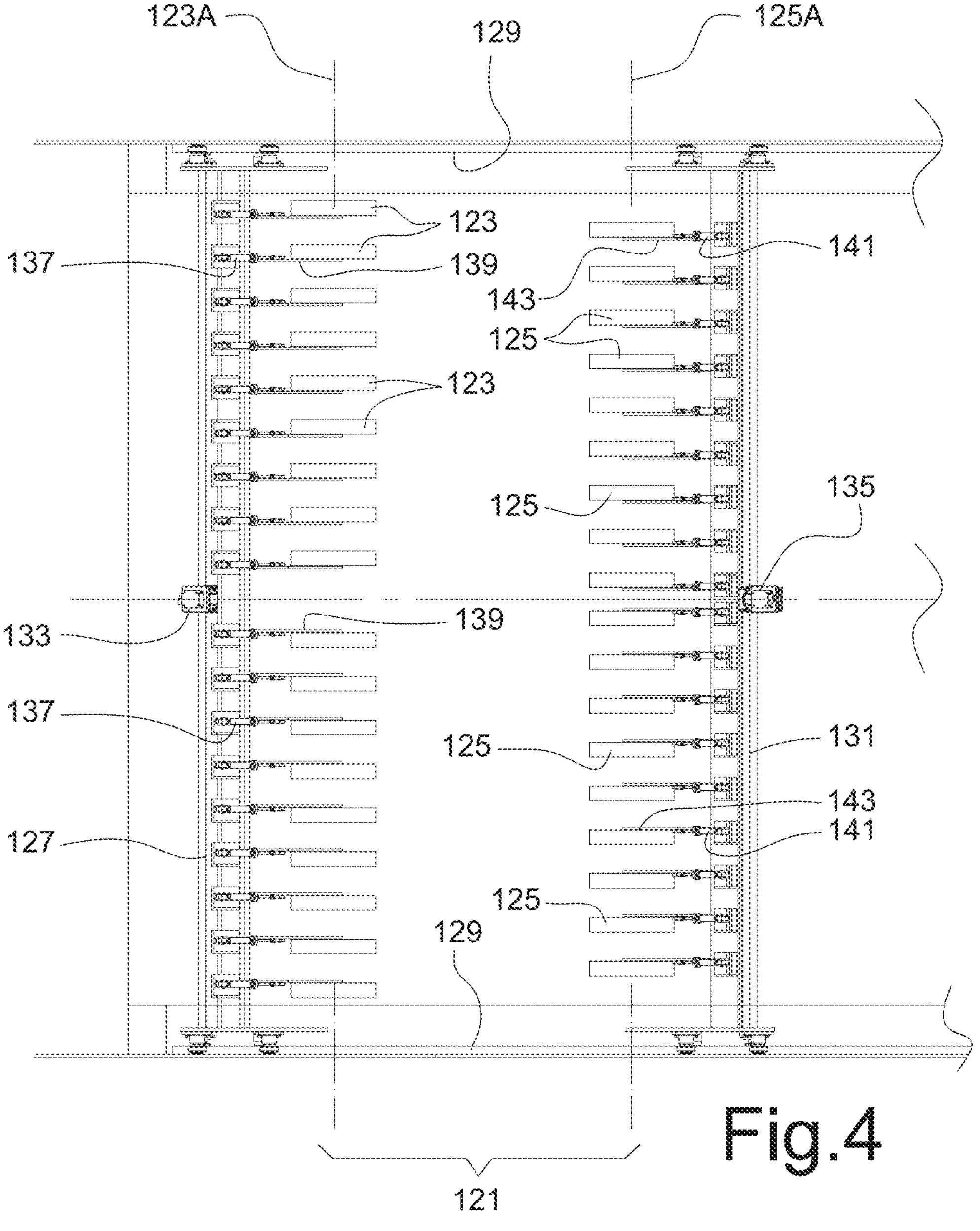
FIG. 4 is a plan view according to IV-IV of FIG. 3.

The wheels 123, supported on the first slide 127, can be raised and lowered relative to the shingling conveyor 101. To this end, one or more actuators are provided. In the illustrated embodiment (see in particular FIGS. 3 and 4), for each wheel 123 a cylinder-piston actuator 137 is provided, which controls a pivoting movement of a respective movable arm 139, hinged, at a proximal end, to the slide 127 and bearing, at the distal end, the respective wheel 123. The pivoting axis of the movable arms 139 is parallel to the axes 123A, 125A. Similarly, the wheels 125 supported on the second slide 131 can be raised and lowered relative to the shingling conveyor 101 by cylinder-piston actuators 141, each of which controls a pivoting movement of a respective movable arm 143, hinged, at a proximal end, to the slide 131, and bearing, at the distal end, the respective wheel 125. The pivoting axis of the movable arms 141 is parallel to the axes 123A, 125A.

The arms 143 face the first slide 127 and the arms 139 face the second slide 131.

The wheels 123 are spaced apart from each other. Similarly, the wheels 125 are spaced apart from each other and the mutual position of the two sets of wheels 123, 125 is such that the wheels 125 can be introduced into the spaces between the wheels 123, until the wheels 123, 125 are brought into a coaxial arrangement, that is, with the rotation axes 123A, 125A coinciding with each other.

This arrangement of the braking device 121 allows the wheels 123 and 125 to be quickly positioned in the correct position for each order of sheet FB without interfering with the work cycle, i.e., it allows the braking wheels 123, 125 to be correctly positioned each time in the correct position for processing the order following the one instantaneously processed.

How this occurs is illustrated in two different operation cycles in the sequence of FIGS. 5A-5F and 6A-6F, respectively.

Figure 5A:
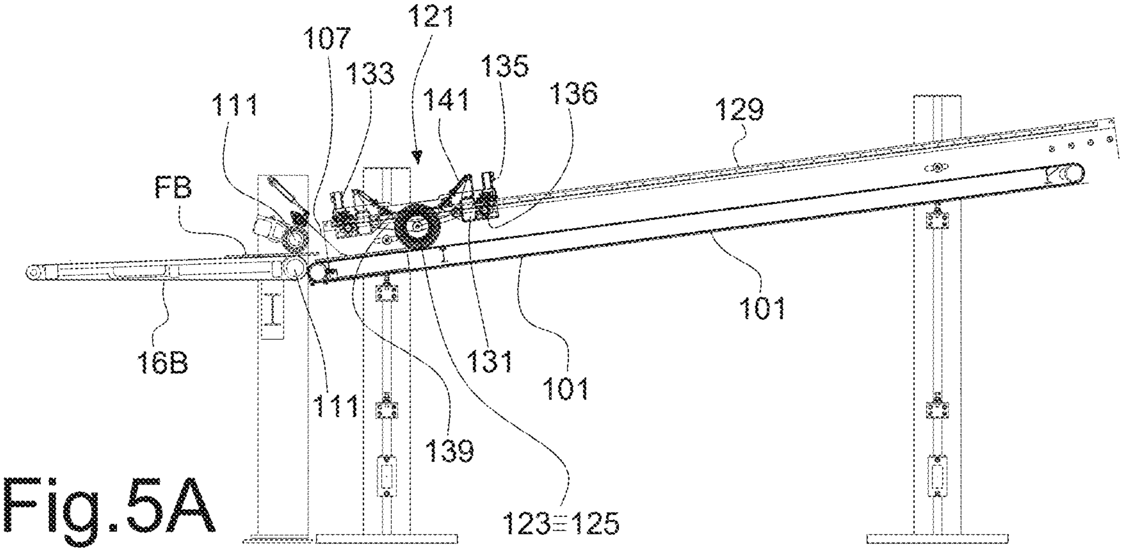
FIGS. 5A-5F show a first operational sequence of the shingling conveyor and the braking device when shifting from one production order to the following production order.
Figure 5B:
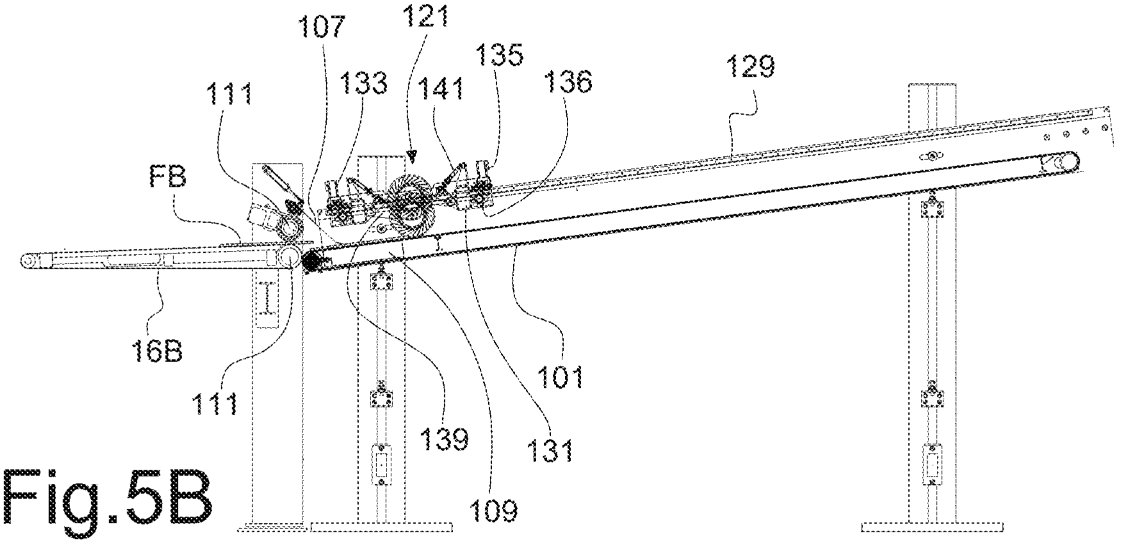

The sequence in FIGS. 5A-5F shows how the braking device is positioned when the production line needs to switch from the production of sheets FB of shorter length (in the feed direction fF) to the production of sheets of greater length. In FIG. 5A, the wheels 123, 125 are coaxial, i.e. interposed, with one another, so that they substantially form a single set of wheels enveloped in a cylindrical surface. The position of the wheels 123, 125 relative to the inlet of the shingling conveyor 101 is defined so that the wheels stop each sheet FB in the correct position when it is ejected onto the shingling conveyor 101. This position is determined by the length of the sheets FB in the direction fF.

Figure 5C:
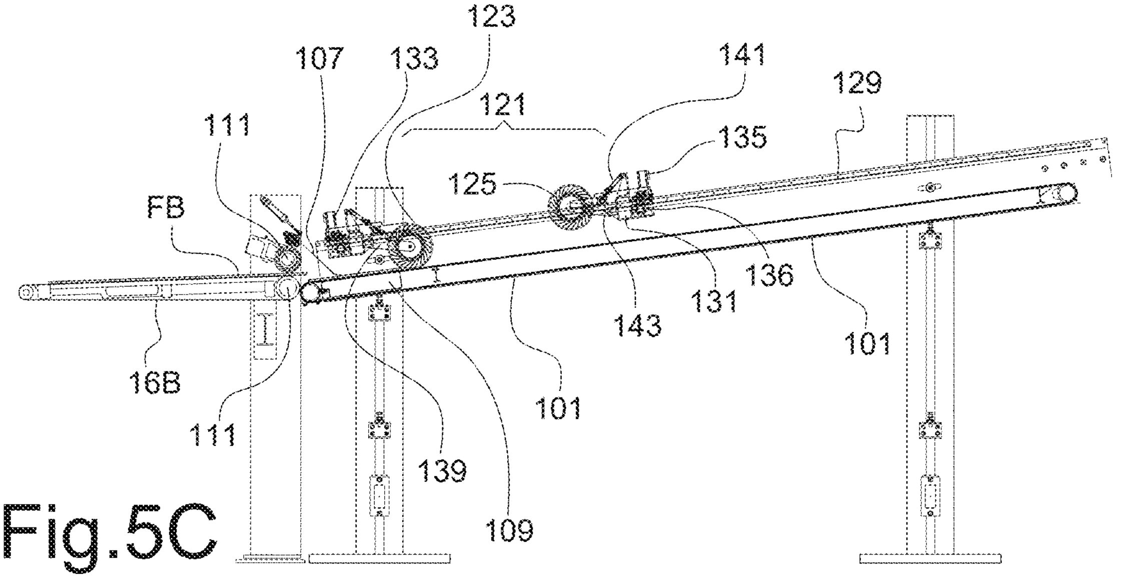

Assuming that the next production order consists of longer sheets, it is necessary to position a set of wheels, and more precisely the wheels 125 of the second set of wheels, in the most forward position in the direction fF, defined by the length of the sheets of the next order. This translation is achieved by translating the slide 131 while the slide 127 remains in the same position. In this way, the wheels 123 of the first set of wheels remain in the correct position to slow down the shorter sheets FB, while the wheels 125 of the second set move downstream. The movement begins with a lift of the wheels 125 (FIG. 5B), then to allow the slide 131 to move in the direction fF (FIG. 5C) up to the required position to process longer sheets. In FIG. 5C the wheels 125 of the second set are still raised and do not interfere with the forward movement of the sheets FB, which continue to be stopped by the wheels 123.

Figure 5D:
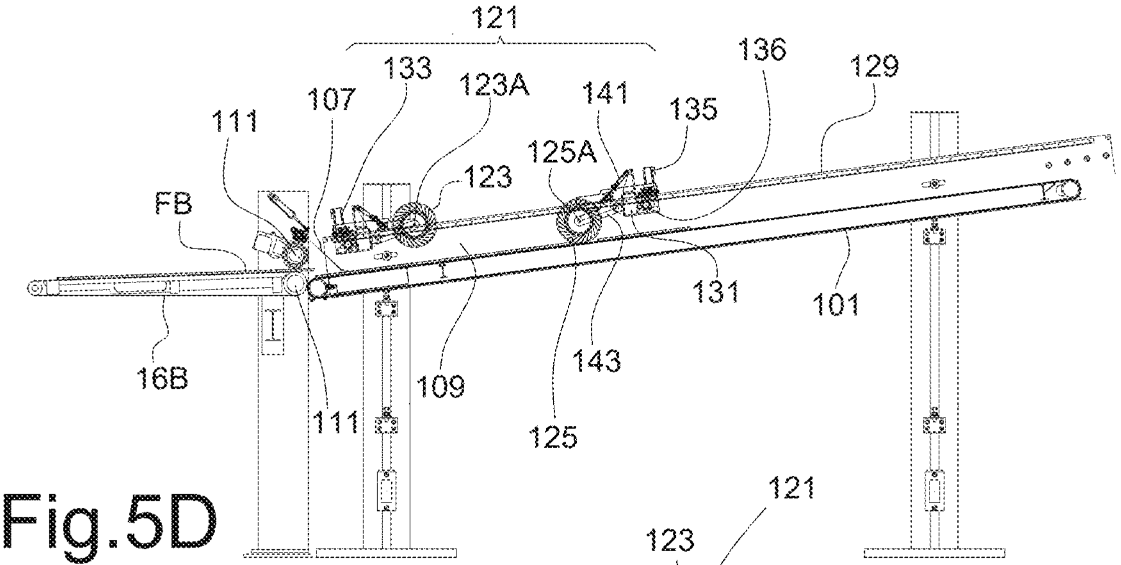

When the production line 1 starts to produce longer sheets FB, the front edge of which shall stop by abutting against the wheels 125 of the second set of wheels, the wheels 123 of the first set are raised and the wheels 125 of the second set are lowered onto the shingling conveyor 101, as shown in FIG. 5D. The longer sheets FB, starting from the first one of the new order, move forward to the position of the wheels 125, where they are stopped, and then move forward from this position at the same speed of the shingling conveyor 101, this resulting in the overlapping of the longer sheets.

Figure 5E:
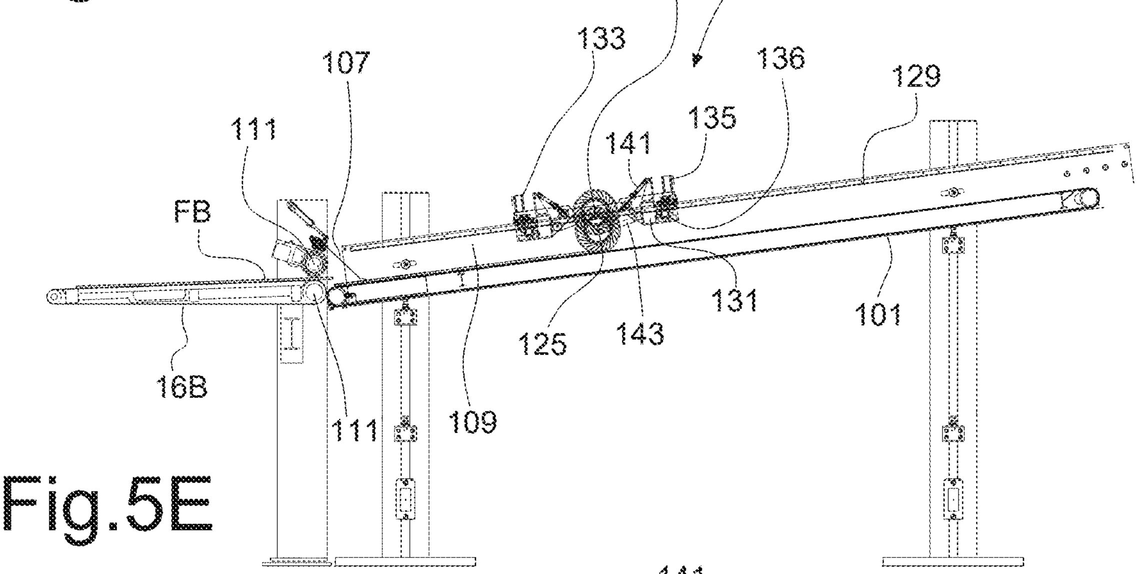
Figure 5F:
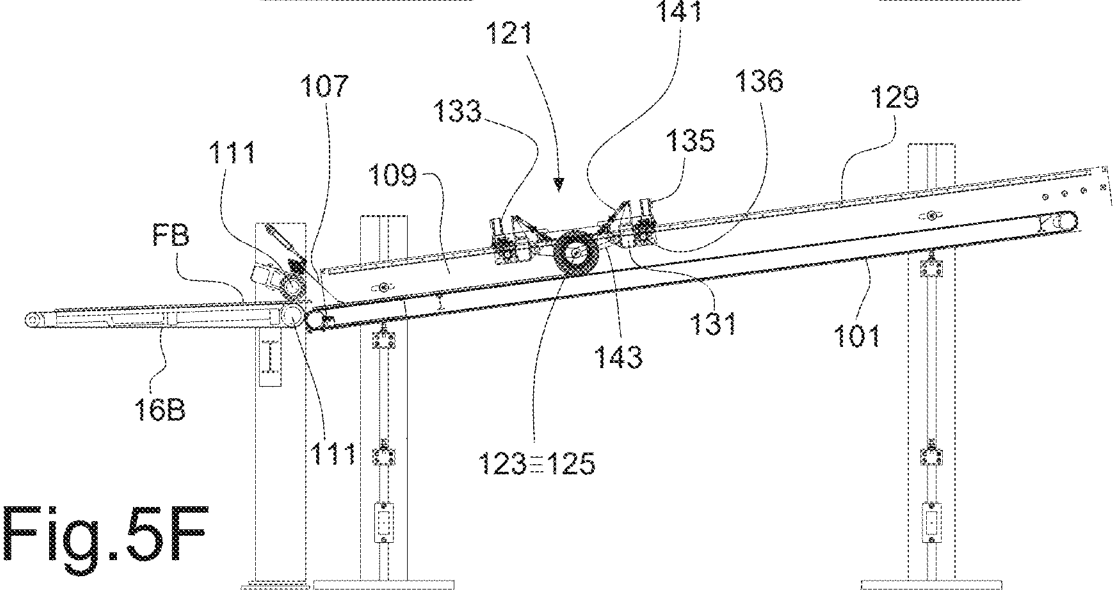

In the subsequent steps of FIGS. 5E and 5F, the wheels 123 of the first set are translated and brought into a position coaxial with the wheels 125. This operation allows, at a later time, to repositioned the wheels for processing the next order.

Figure 6A:
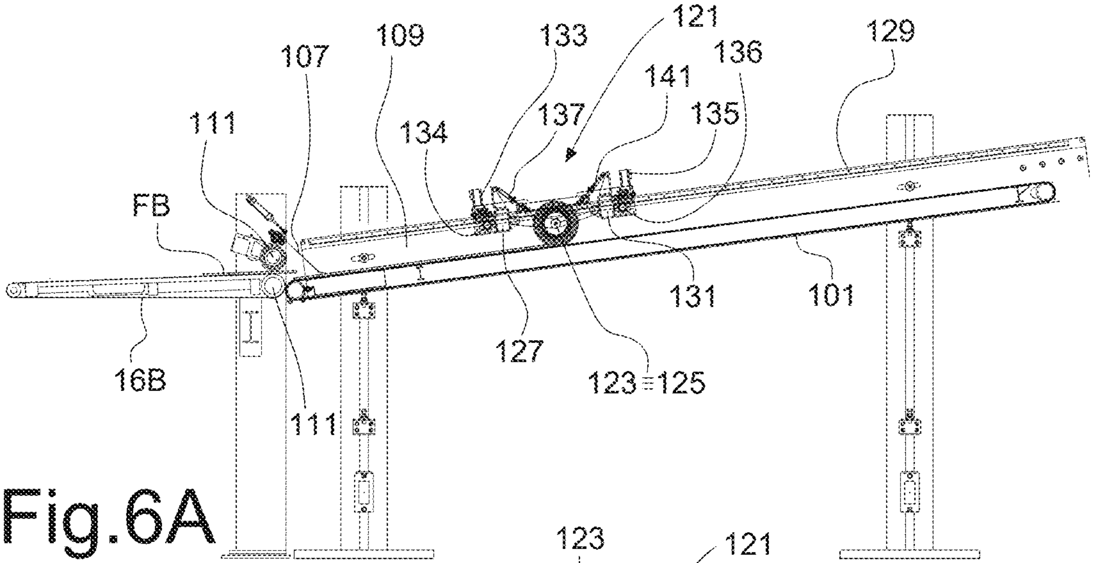
FIGS. 6A-6F show a second operational sequence of the shingling conveyor and the braking device when shifting from one production order to the following production order.
Figure 6B:
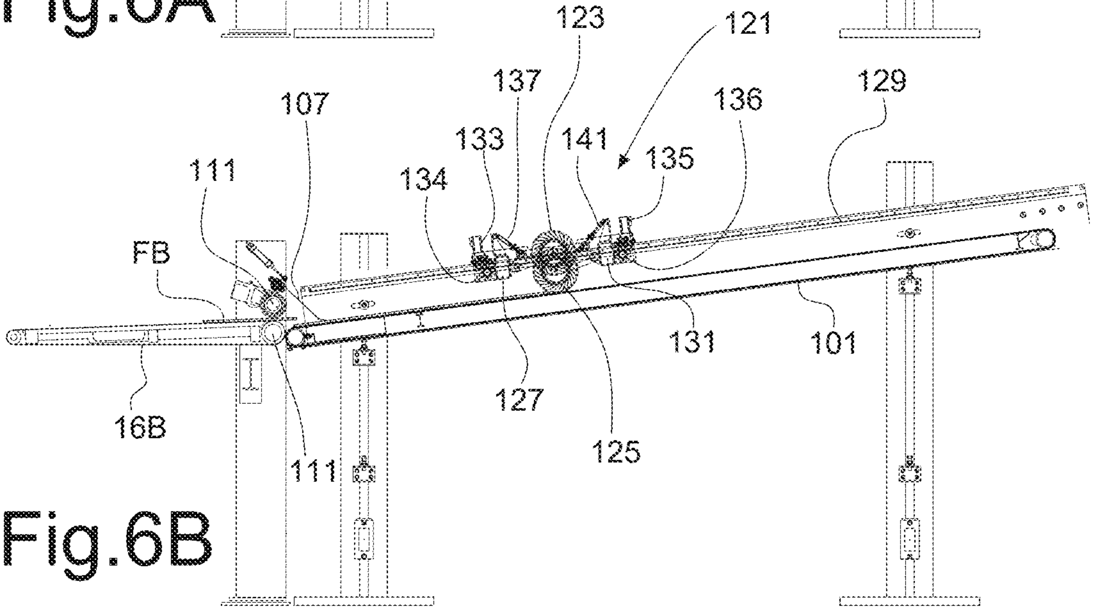
Figure 6C:
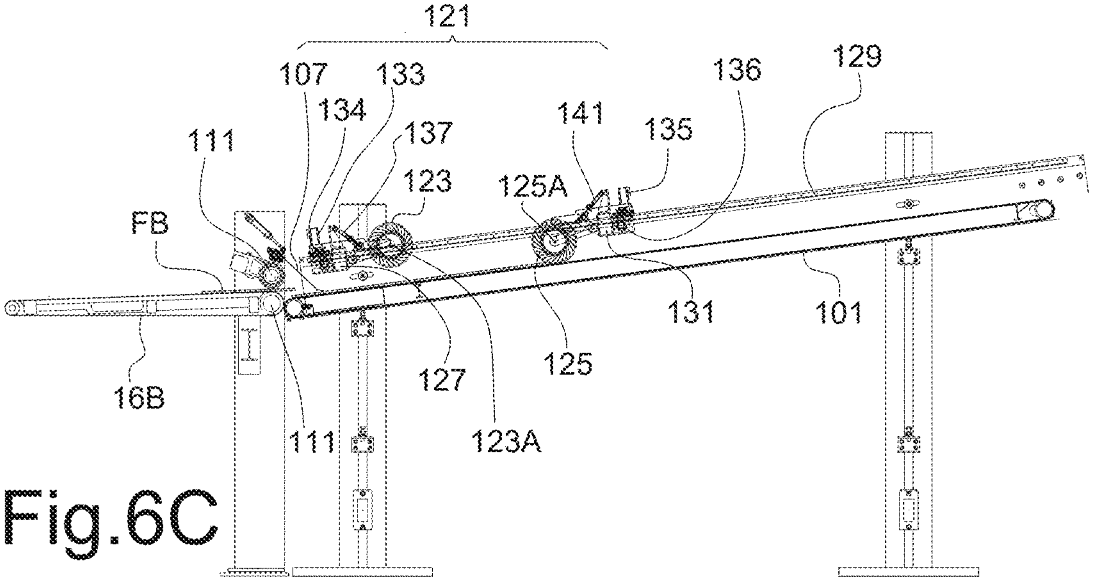
Figure 6D:
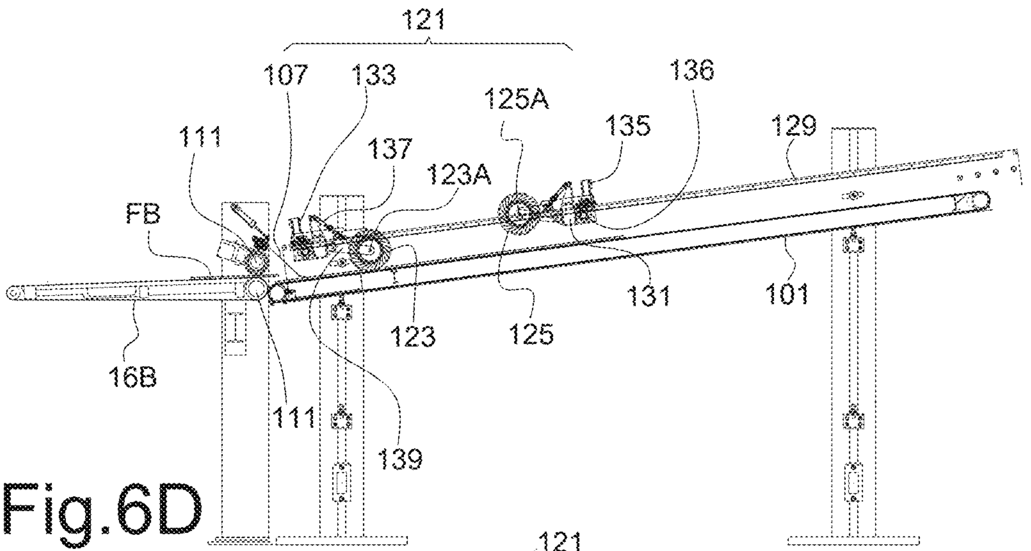
Figure 6E:
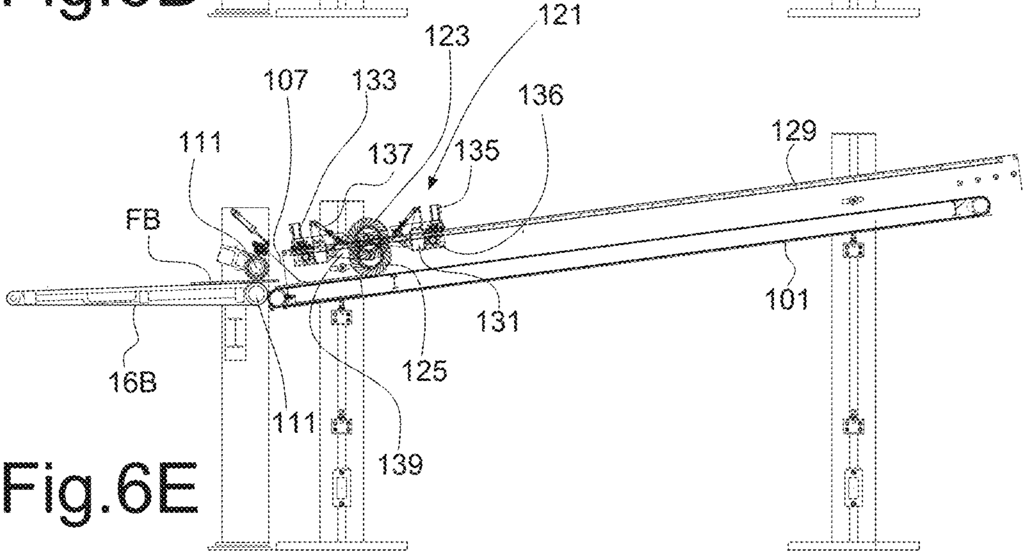
Figure 6F:
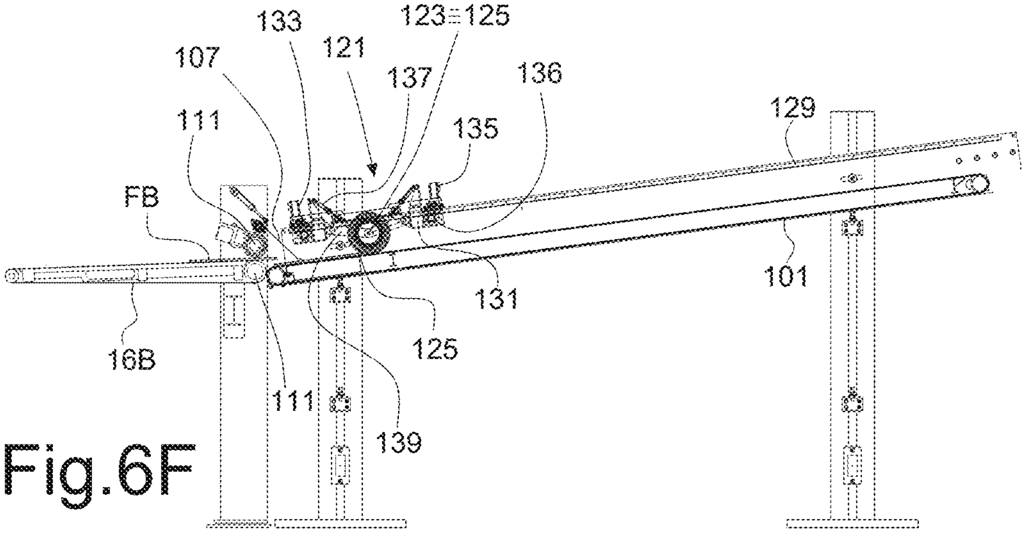

The sequence of FIGS. 6A-6F shows the reverse case, where the braking device needs to be repositioned from the position where it brakes long sheets FB (FIG. 6A) to the position where it brakes short sheets FB (FIG. 6F).

Thus, with the described device, it is possible to slow down, effectively and gently, the corrugated board sheets without using brushes, foils or other elements potentially harmful to the sheets FB, FA. In addition, the arrangement of two sets of wheels 123, 125 allows the braking wheels to be positioned in the correct position before the arrival of the sheets of each successive order. This allows the device always to be correctly configured, for any order being processed, with no production losses, no risk of jamming, resulting in a consequent smooth and fast operation.

What is claimed is:

1. A shingling device for partially overlapping the sheets of a stream of sheets in shingling fashion; the device comprising:

a shingling conveyor, adapted to receive a stream of sheets aligned with one another and not overlapping;

a braking device, positioned above the shingling conveyor and configured to slow down the sheets arriving to the shingling conveyor, and to partially overlap the incoming sheets in shingling fashion;

wherein the braking device comprises: a first set of braking wheels aligned with one another along a first rotation axis orthogonal to a feed direction of the sheets on the shingling conveyor; and a second set of braking wheels aligned with one another along a second rotation axis orthogonal to the feed direction of the sheets on the shingling conveyor; and wherein the first set of braking wheels and the second set of braking wheels are movable independently of each other along the shingling conveyor so as to take working positions at variable distances from an entrance end of the shingling conveyor; and wherein the braking wheels of the first set of braking wheels are carried by a first slide, and the braking wheels of the second set of braking wheels are carried by a second slide.

2. The device of claim 1, wherein the first set of braking wheels and the second set of braking wheels are offset from each other in the direction of their respective rotation axes, so that the first set of braking wheels and the second set of braking wheels can be arranged coaxially with each other, with the braking wheels of the first set of braking wheels interposed between the braking wheels of the second set of braking wheels.

3. The device of claim 1, wherein a common guide extends along the shingling conveyor; and wherein the first slide and the second slide are movable along the guide.

4. The device of claim 1, wherein each braking wheel is supported on the respective slide by a respective movable arm adapted to raise and to lower the braking wheel relative to the shingling conveyor.

5. The device of claim 4, wherein the movable arms are swinging arms, hinged to the respective slide around an axis parallel to the rotation axis of the braking wheels.

6. The device of claim 4, wherein the movable arms carried by the first slide extend from the first slide toward the second slide and support the braking wheels of the first set of braking wheels at distal ends of the movable arms; and wherein the movable arms carried by the second slide extend from the second slide toward the first slide and support the braking wheels of the second set of braking wheels at distal ends of the movable arms.

7. The device of claim 1, comprising a feed conveyor provided upstream of the shingling conveyor; and wherein, in use, the feed conveyor has a higher feed rate than the shingling conveyor.

8. The device of claim 1, comprising a transfer conveyor downstream of the shingling conveyor in the sheet feeding direction.

9. The device of claim 8, wherein a retaining member for temporary retaining the shingled sheets is associated with the transfer conveyor, so as to create a gap in the flow of shingled sheets between the shingling conveyor and a stacker.

10. A line for stacking a plurality of sheets, the line comprising:

a cut-off knife configured to perform transverse cuts on a web material to divide the web material into a plurality of sheets;

a shingling device arranged downstream of the cut-off knife;

wherein the shingling device comprises: a shingling conveyor, adapted to receive a stream of sheets aligned with one another and not overlapping; and a braking device, positioned above the shingling conveyor and configured to slow down the sheets arriving to the shingling conveyor, and to partially overlap the incoming sheets in shingling fashion; and wherein the braking device comprises: a first set of braking wheels aligned with one another along a first rotation axis orthogonal to a feed direction of the sheets on the shingling conveyor; and a second set of braking wheels aligned with one another along a second rotation axis orthogonal to the feed direction of the sheets on the shingling conveyor; and wherein the first set of braking wheels and the second set of braking wheels are movable independently of each other along the shingling conveyor so as to take working positions at variable distances from an entrance end of the shingling conveyor; and wherein the braking wheels of the first set of braking wheels are carried by a first slide, and the braking wheels of the second set of braking wheels are carried by a second slide.

11. The line of claim 10, further comprising a stacker, arranged downstream of the shingling device and configured to stack, in a stack or a bundle, the shingled sheets fed from the shingling device.

12. A corrugated board production line comprising:

at least one single facer for producing a web of single-face corrugated board;

at least one double facer to combine a web of single-face corrugated board, coming from the single facer, and a web of smooth paper, and to form therewith a web of corrugated board;

a cut-off knife to cut perform transverse cuts on the web of corrugated board, coming from the double facer, into sheets of corrugated board;

a shingling device arranged downstream of the cut-off knife and upstream of a stacker;

wherein the shingling device comprises: a shingling conveyor, adapted to receive a stream of sheets aligned with one another and not overlapping; and a braking device, positioned above the shingling conveyor and configured to slow down the sheets arriving to the shingling conveyor, and to partially overlap the incoming sheets in shingling fashion; and wherein the braking device comprises: a first set of braking wheels aligned with one another along a first rotation axis orthogonal to a feed direction of the sheets on the shingling conveyor; and a second set of braking wheels aligned with one another along a second rotation axis orthogonal to the feed direction of the sheets on the shingling conveyor; and wherein the first set of braking wheels and the second set of braking wheels are movable independently of each other along the shingling conveyor so as to take working positions at variable distances from an entrance end of the shingling conveyor; and wherein the braking wheels of the first set of braking wheels are carried by a first slide, and the braking wheels of the second set of braking wheels are carried by a second slide.

13. The line of claim 12, further comprising a slitting and scoring section, downstream of the double facer and upstream of the cut-off knife, wherein the slitting and scoring section is configured to cut the web of corrugated board, exiting the double facer, into a plurality of corrugated board strips, and to score longitudinally the corrugated board.

* * * * *